(12) United States Patent
Santavicca, Jr. et al.

(10) Patent No.: US 10,011,344 B1
(45) Date of Patent: Jul. 3, 2018

(54) PLASMA CONTROL AND POWER SYSTEM

(75) Inventors: Edmund J. Santavicca, Jr., Lakewood, OH (US); Srikanth Vasudevan, Cleveland, OH (US); Frederick J. Lisy, Euclid, OH (US); Mike Ward, Tallmadge, OH (US)

(73) Assignee: Orbital Research Inc., Cleveland, OH (US)

( * ) Notice: Subject to any disclaimer, the term of this patent is extended or adjusted under 35 U.S.C. 154(b) by 1867 days.

(21) Appl. No.: 12/983,205

(22) Filed: Dec. 31, 2010
(Under 37 CFR 1.47)

Related U.S. Application Data

(60) Provisional application No. 61/291,570, filed on Dec. 31, 2009.

(51) Int. Cl.
| | | |
|---|---|---|
| *B64C 1/38* | (2006.01) | |
| *B64C 21/00* | (2006.01) | |
| *B64C 9/00* | (2006.01) | |
| *B64C 23/00* | (2006.01) | |
| *B64C 13/16* | (2006.01) | |
| *B64C 29/00* | (2006.01) | |

(52) U.S. Cl.
CPC .................. *B64C 1/38* (2013.01); *B64C 9/00* (2013.01); *B64C 13/16* (2013.01); *B64C 21/00* (2013.01); *B64C 23/00* (2013.01); *B64C 29/00* (2013.01); *B64C 2230/12* (2013.01)

(58) Field of Classification Search
CPC ....... B64C 1/38; B64C 29/00; B64C 2230/12; B64C 21/00; B64C 9/00; B64C 13/16; B64C 23/00
USPC ............. 244/130, 205, 204.1, 201, 204, 203
See application file for complete search history.

(56) References Cited

U.S. PATENT DOCUMENTS

| | | | | |
|---|---|---|---|---|
| 6,421,754 | B1* | 7/2002 | Kau et al. ...................... | 710/261 |
| 7,624,941 | B1* | 12/2009 | Patel et al. ................... | 244/3.22 |
| 7,735,910 | B2* | 6/2010 | Ramsay ....................... | 296/217 |
| 7,954,768 | B1* | 6/2011 | Patel et al. ................... | 244/205 |
| 8,038,397 | B2 | 10/2011 | Saddoughi et al. | |
| 8,091,950 | B2 | 1/2012 | Corke et al. | |
| 8,148,843 | B2* | 4/2012 | Sechrist ........................ | 307/9.1 |

(Continued)

OTHER PUBLICATIONS

Mehul P. Patel et al. 'Scaling Effects of an Aerodynamic Plasma Actuator', Jan. 2008, Journal of Aircraft.*
Janusz A. Starzyk et al. 'A DC-DC Charge Pump Design Based on Voltage Doublers', Mar. 2001, IEEE Transactions on Circuits and Sytems.*

(Continued)

*Primary Examiner* — Assres H Woldemaryam
(74) *Attorney, Agent, or Firm* — Brian Kolkowski

(57) ABSTRACT

An improved high-voltage AC power supply energizes and regulates plasma actuators for aerodynamic flow control. Such plasma actuators are used, for example, on aerodynamic surfaces, wind turbine blades, and the like for vehicle control, drag or noise reduction, or efficient power generation. Various embodiments of the power supply are small, compact, lightweight, portable, modular, self-contained in its own housing, easily replaceable and swappable, autonomous, self-cooling, and/or gangable in series or parallel to provide any desired control authority over the selected surface. In some embodiments, the parameters for the plasma electronics can be manually selected and pre-programmed for a specific application, while in preferred embodiments, the plasma electronics can automatically identify the appropriate parameters and self-tune the performance of the plasma actuators.

20 Claims, 4 Drawing Sheets

(56) References Cited

U.S. PATENT DOCUMENTS

| | | | |
|---|---|---|---|
| 8,191,833 B1* | 6/2012 | DiCocco et al. | 244/200.1 |
| 8,220,753 B2* | 7/2012 | Silkey et al. | 244/205 |
| 8,267,355 B1* | 9/2012 | Patel et al. | 244/205 |
| 2004/0175598 A1* | 9/2004 | Bliven et al. | 429/12 |
| 2004/0195462 A1* | 10/2004 | Malmuth et al. | 244/205 |
| 2006/0158135 A1* | 7/2006 | Newton | 315/274 |
| 2008/0067283 A1* | 3/2008 | Thomas | 244/1 N |
| 2008/0290218 A1* | 11/2008 | Schwimley et al. | 244/130 |
| 2009/0065064 A1 | 3/2009 | Morris et al. | |
| 2009/0212164 A1* | 8/2009 | Osborne et al. | 244/205 |
| 2010/0004799 A1* | 1/2010 | Drouin et al. | 701/3 |
| 2010/0047055 A1 | 2/2010 | Wadia et al. | |
| 2010/0133386 A1* | 6/2010 | Schwimley et al. | 244/205 |
| 2010/0156171 A1* | 6/2010 | Sechrist | 307/9.1 |
| 2010/0224733 A1* | 9/2010 | Wood et al. | 244/205 |
| 2010/0284825 A1* | 11/2010 | Land et al. | 417/48 |
| 2010/0308177 A1* | 12/2010 | McClure et al. | 244/205 |
| 2010/0329838 A1 | 12/2010 | Greenblatt | |
| 2011/0180149 A1 | 7/2011 | Fine | |

OTHER PUBLICATIONS

Patel et al., "Scaling effects of an aerodynamic plasma actuator", Journal of Aircraft, Jan.-Feb. 2008, vol. 45, No. 1, presented as Paper 635 at the 45th AIAA Aerospace Sciences Meeting and Exhibit, Reno, NV, Jan. 8-11, 2007; received Apr. 28, 2007; revision received Aug. 17, 2007; accepted for publication Aug. 19, 2007; published by the American Institute of Aeronautics and Astronautics, Inc.

Lopera et al., "Aerodynamic control using windward-surface plasma actuators on a separation ramp", Journal of Aircraft, Nov.-Dec. 2007, vol. 44, No. 6, presented as Paper 0636 at the 45th AIAA Aerospace Sciences Meeting and Exhibit, Reno, NV, Jan. 8-11, 2007; received Feb. 28, 2007; revision received Mar. 26, 2007; accepted for publication Apr. 1, 2007; published by the American Institute of Aeronautics and Astronautics, Inc.

Enloe et al., "Mechanisms and responses of a single dielectric barrier plasma actuator: geometric effects", AIAA Journal, Mar. 2004, vol. 42, No. 3, Received Jul. 15, 2003; revision received Oct. 6, 2003; accepted for publication Oct. 7, 2003.

Corke et al., "Phased plasma arrays for unsteady flow control", Jun. 19-22, 2000, AIAA 2000-2323, Fluids 2000, Denver, Colorado.

\* cited by examiner

PLASMA CONTROL AND POWER SYSTEM

PRIORITY CLAIM

This application claims priority to U.S. provisional application 61/291,570, filed Dec. 31, 2009.

STATEMENT REGARDING FEDERALLY-SPONSORED RESEARCH OR DEVELOPMENT

The U.S. has a paid-up license in this invention and the right in limited circumstances to require the patent owner to license others on reasonable terms provided for by the terms of grants F33615-03-M-3327, FA8650-04-C-3405, and FA8651-05-C-0105 awarded by the U.S. Air Force, AFRL, Air Vehicles Directorate, Wright-Patterson Air Force Base.

BACKGROUND OF THE INVENTION

(1) Field of the Invention

The present invention relates to electrical power supplies and particularly to high-voltage AC power supplies for the energization (i.e., the powering) and/or regulation of plasma actuators.

The plasma actuators discussed in this application should be considered of same or similar type to those previously described in, for example, U.S. Pat. No. 7,624,941 B1 to Patel et al., U.S. Patent Application Publication 2008/0067283 A1 to Thomas, U.S. Patent Application Publication 2008/0122252 A1 to Corke et al., U.S. Patent Application Publication 2010/0047055 A1 to Wadia et al., U.S. patent application Ser. No. 11/983,849, "Mechanisms and responses of a single dielectric barrier plasma actuator" in *AIAA Journal* Vol. 42, No. 3, March 2004, by Enloe et al., and "Phased plasma arrays for unsteady flow control" in AIAA Fluids 2000, Jun. 19-22, 2000, Denver, Colo., by Corke et al. All of the references listed in this application, including their figures, are hereby expressly incorporated by reference into this application.

Plasma actuators may substantially improve the fuel efficiency of ground vehicles such as trucks, SUVs and pickups. The approach for ground vehicle applications utilizes dielectric barrier discharge (DBD) plasma actuators to reduce aerodynamic wake-drag while preserving the functionality of vehicles. The improvements come by preventing flow separations in the wake of the vehicle using plasma flow-configured shape and flow tailoring concepts enabled via the plasma electronics. In addition to reducing aerodynamic drag, the plasma actuators can be further expanded to (1) reduce vehicle weight and improve fuel efficiency (via upforce production), (2) improve braking (via downforce production), and (3) safety, stability and handling (via side force alleviation), which should translate into a substantial increase in the overall vehicle performance, efficiency, and economy. To accomplish these benefits, the control derived from the plasma actuators involve exposing and encapsulated electrodes that are driven by an AC voltage source to the environment. A properly designed AC voltage supplied via plasma electronics causes the air over the plasma actuator typically a single or double dielectric barrier discharge actuator to ionize (forming the plasma). The combination of the electric field produced by the plasma actuator electrodes and ionized air redirects and accelerates the bulk air. This air flow is then optimized to create the desired control force. The plasma actuators are fully electric with no moving parts. They can be applied to, laminated onto, or integrated within the surface of the vehicle leaving a smooth surface without parasitic drag. These plasma actuators with properly designed plasma electronics require very little power to operate so that large net system improvements are realizable.

(2) Description of Related Art

In typical applications involving plasma actuators, high voltage AC power supplies are needed for their energization. Voltages required for useful energization tend to be in the multiple-kilovolt range.

As of the filing of this application, plasma actuation for the applications described herein has been experimental. One of the major impediments to commercialization and widespread use of plasma actuators for aerodynamic flow control has been the large size, heavy weight, high cost, and lack of suitable control of the power supplies required for the energization and regulation of the plasma actuators. For example, in a laboratory experimental plasma actuators are powered by large, rack-mounted power supply equipment. What is needed, therefore, is a plasma actuator power supply that is small, compact, portable, modular, inexpensive, and preferably can be built using off-the-shelf commercial components so as to reduce as much as possible the cost of its manufacture and use. What is further needed is a plasma actuator power supply that is capable of automatic closed-loop or open-loop feedback control so as to provide the maximally efficient duty cycle, AC voltage, frequency, waveform type demanded of the application and conditions of the plasma actuators.

SUMMARY OF THE INVENTION

The present invention relates to electrical power supplies and particularly to high-voltage AC power supplies for the energization of plasma actuators. Such plasma actuators may be used, for example, on aerodynamic surfaces, wind turbine blades, and the like for vehicle control, drag or noise reduction, or efficient power generation. The present invention further relates to electrical power supplies that are small, compact, lightweight, portable, modular, self-contained in their own housing, easily replaceable and swappable, autonomous, self-cooling, and/or gangable in series or parallel to provide any desired control authority over the selected surface. The phrases "plasma electronics" and "power supply" should be considered synonymous throughout this application, except that in some cases, as distinguished by context, "plasma electronics" may include not only one or more power supplies but also the associated controller electronics for the control of the power one or more power supplies and/or also the sensors and/or mission computers, etc. that feed information to the controller electronics.

The plasma electronics of the present invention have been designed to be applicable to a variety of platforms that could utilize plasma actuators for aerodynamic flow control. In some embodiments, the parameters for the plasma electronics can be manually selected and pre-programmed for a specific application, while in preferred embodiments, the plasma electronics can automatically identify the appropriate parameters and self-tune the performance of the plasma actuators. Examples of this functionality are to follow.

The present invention incorporates formulations for the "plasma effect" that have been included in fluid flow solvers for prediction and optimization of shapes that could further change the performance of the vehicle. Key to tailoring the performance of the vehicle is the plasma electronics.

Typically, the implementation of plasma actuator and corresponding electronics is for vehicle wake-drag reduction. In doing so (a) baseline characterization of a chosen aerostructure must be performed which will define the power, volume, and other functionality constraints for use of the plasma hardware and plasma electronics and control system which will require an open-loop or closed-loop mode (signal from a speed sensor will be used to turn the actuator off/on).

The plasma electronics of the present invention have been designed to be modular in configuration. The plasma electronics can be included as part of a flow control module consisting of the plasma actuators, a power source and sensors to provide feedback to the plasma actuators. This module has been designed to be small in size, to require low power and to be integrated into the platform such as a wing, or a wind turbine blade or hub. In the wind turbine example, the hub can be used as a source to generate the power for powering the electronics as well as powering the plasma actuators. The plasma electronics would have a means to store power such as a battery or a capacitor until sufficient power is generated from the generator integrated into the hub. Upon identification of conditions that would utilize plasma actuators, such as, in the wind turbine example, a new windy condition after a windless period, the plasma electronics would identify the appropriate parameters to produce the desired output of the plasma actuators, which desired output might be, in the wind turbine example, an activation of the plasma actuators at the duty cycle determined to best adhere the boundary layer of air to the turbine blade for maximally efficient-spin up of the turbine.

For wind turbine applications, the plasma actuators may be utilized to attach or to separate flow as determined by a controller either integrated within the plasma electronics or external to them to control wind turbine performance. Wind turbines and wind turbine blades are subject to environmental conditions that range from unidirectional low-speed winds to rapidly changing high-speed winds that impact both the front and back surfaces of the wind turbine blades. The plasma electronics may provide signals to the plasma actuators to produce the desired effects on the wind turbine blades. More importantly, the plasma electronics of the present invention are able to modify the performance of the plasma actuators from no times per revolution to several thousand times per revolution based on the sensor feedback which is influenced by the air flow. This feature of the plasma electronics allows the plasma actuators to create additional forces/conditions over the structure—in the case, wind turbine blades—as often as the environmental or air flow conditions change. The self-tuning or pre-programmed parameter selection will enable continual performance change under dynamic conditions.

In some embodiments the plasma electronics will be integrated into a vehicle and wires or other conductive media will be used to connect the plasma electronics to the plasma actuators. For a ground vehicle example, the plasma actuators may be placed on or integrated into the rear window of a vehicle, the plasma electronics may be located in the roof of the vehicle or near the trunk or rear end, and a method to connect to the plasma actuators will be provided in a manner similar to the integrated electronics used to defrost a rear window. In this example, the plasma actuators may degrade with time. Hence the plasma electronics of the present invention advantageously have an electronic feedback mechanism that indicates when the plasma actuators need to be replaced. In this example, the plasma electronics may use one of several methods to send a signal to the owner, repair person or via a display that indicates the plasma actuators need to be replaced or repaired. The operation of the plasma actuators may be related to the speed of the vehicle. In this example, the plasma electronics would utilize a pre-programmed set of parameters for the desired effects of the plasma actuators onto the airflow over the vehicle. Additionally, the vehicle may be subject to cross winds, turbulence associated with other vehicles or objects (e.g., bridges), etc., that will require the self-tuning mechanism associated with the plasma electronics. In this example, a sensor or other means would identify these additional aerodynamic loads on the vehicle and select the appropriate parameters for use with the plasma actuators.

In some instances the plasma electronics will supply a steady or unsteady voltage to the plasma electronics for continuous operation. In other cases, the plasma electronics will receive feedback from a sensor or a controller which will request certain parameters to the plasma electronics for generating the plasma actuators.

The term "aero platform" as used in this disclosure is intended to mean any air vehicle, airplane, helicopter, slender-body air vehicle, unmanned air vehicle (UAV), micro air vehicle, projectile, weaponized projectile, munition, missile, rocket, grenade, etc. that, at least some of the time, flies through the air and thus is substantially surrounded, encapsulated, or enclosed by an aero structure.

A "ground vehicle" may be a car, truck, tank, or any other commonly known non-flying vehicle. It may or may not contain passengers; i.e., it may be robotic or remotely controlled.

The term "aerostructure" as used in this disclosure is intended to mean the basic aerodynamic shell of a vehicle or projectile, whether air- or ground-based. The aerostructure substantially surrounds and encapsulates the ground or air vehicle or projectile, etc. and air flows around the aerostructure as the vehicle, etc., moves through the air (even if along the ground). The aerostructure of a car, then, for example, consists of the doors, hood, trunk, fenders, windshields, windows, and other external surfaces, and is still said to substantially surround or encapsulate the car even if non-aerodynamic protuberances such as an antenna or wheels may also be part of the car. An aerostructure may include the airbody, fuselage, wings, spoilers, canards, fins, flaps, elevators, elevons, stabilizers, stabilators, tailplanes, rudders, and similar structures even if they protrude from the main part of the aerostructure. That an aerostructure does not completely encapsulate or enclose a vehicle does not prevent it from being an aerostructure.

The terms "modular" or "module" as used in this application should be expressly construed to connote a self-contained system enclosed within its own housing, having one or more connectors for electrically connecting to other systems or subsystems, optionally having one or more fasteners such as screws, bolts, snaps, etc., for secure installation, and being easily swappable or replaceable with like modular units in a fashion that is easy and quick to perform. Any system that requires undue hooking up of numerous electrical connections, soldering, drilling, sawing, or any disassembly or re-assembly of any part of the system internal to the "module" should not be considered modular. "Modular" expressly does not merely mean a structure that is merely repeated in a larger structure, if the repeated structure does not also conform to the above definition.

The term "modifying," with reference to lift or drag, means either "increasing" or "reducing."

The term "power supply" as used in this disclosure does not mean merely a source of electrical energy or power. An electrical cell or battery alone is not a "power supply" as the term is used here. A "power supply" must provide the AC voltage, current, duty cycle, and other parameters described herein to appropriately energize the plasma actuators associated with the present invention, and thus must be capable of appropriately conditioning and fluctuating the power from an electrical energy source as required by the plasma actuators to effectively actuate them.

The present invention encompasses a number of different embodiments:

In one embodiment, the invention is an aero platform selected from one of an air vehicle, an unmanned air vehicle (UAV), a micro air vehicle, a projectile, a munition, or a missile, the aero platform being substantially contained within an aerostructure, the aero platform comprising at least one plasma actuator placed on or integrated within the aerostructure and configured to perform one or more of the functions of controlling airflow, reducing noise, reducing vibration, modifying lift, or modifying drag; and at least one self-contained modular plasma electronic power supply integrated into the aerostructure of the aero platform, the power supply having independently and automatically adjustable, non-interactive control of one or more of voltage, frequency, waveform, and duty cycle, wherein the power supply powers, actuates and regulates the at least one plasma actuator.

In another embodiment, the invention consists of a ground vehicle, the ground vehicle being substantially contained within an aerostructure, the ground vehicle comprising at least one plasma actuator placed on or integrated within the aerostructure and configured to perform one or more of the functions of controlling airflow, reducing noise, reducing vibration, modifying lift, or modifying drag; and at least one self-contained modular plasma electronic power supply integrated into the ground vehicle, the power supply having independently and automatically adjustable, non-interactive control of the voltage, frequency, waveform, and duty cycle, wherein the power supply powers and regulates the at least one plasma actuator.

Yet another embodiment of the present invention is a method of plasma surface control for an aero platform selected from one of an air vehicle, an unmanned air vehicle (UAV), a micro air vehicle, a projectile, a munition, or a missile, the aero platform being contained within an aerostructure, the method comprising the steps of (a) locating a plasma actuator on a surface of an aerostructure to control one or more of the functions of controlling airflow, reducing noise, reducing vibration, modifying lift, or modifying drag; (b) obtaining a velocity of air passing over the plasma actuator; and (c) controlling the plasma actuator with a self-contained modular plasma electronic power supply integrated into the aerostructure of the aero platform, the plasma electronic power supply having automatically and independently adjustable non-interactive control of one or more of voltage, frequency, waveform, and duty cycle based at least in part on the velocity of air passing over the plasma actuator.

Preferably, the plasma actuator of various embodiments the present invention is located on or essentially flush to a surface of the aerostructure, the surface having a trailing edge or aft end. Further preferably, the aero platform or ground vehicle further comprises a device for measuring or estimating a velocity of a fluid flowing past the surface of the aerostructure, and wherein the plasma actuator is actuated at a frequency equal to between about 0.6 to about 1.4 times the velocity of the fluid divided by the placement distance of the plasma actuator from the trailing edge or aft end, or the extent of flow separation. Also preferably, the plasma actuator is a dielectric-barrier-discharge plasma actuator. The plasma actuator may be used to reduce vibration or noise, or modify lift or drag.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

DETAILED DESCRIPTION OF THE INVENTION

In preferred embodiments the present invention is a customized plasma power supply substantially built using commercial over-the-shelf (COTS) components. The power supply unit is capable of operating the plasma actuators in both the steady and unsteady modes of operation for a wide range of AC carrier frequency, plasma frequency, duty cycle (required for unsteady mode) and different waveforms (sine, triangle, saw-tooth and square). The power supply contains a 6-cell lithium polymer battery and is a completely self-contained unit. The uniqueness of the plasma power supply is its portability—in its heaviest embodiment it weighs 1.036 kilograms and has a cubic volume of 120 cubic centimeters. Other embodiments are substantially lighter as described herein.

Figure 1:
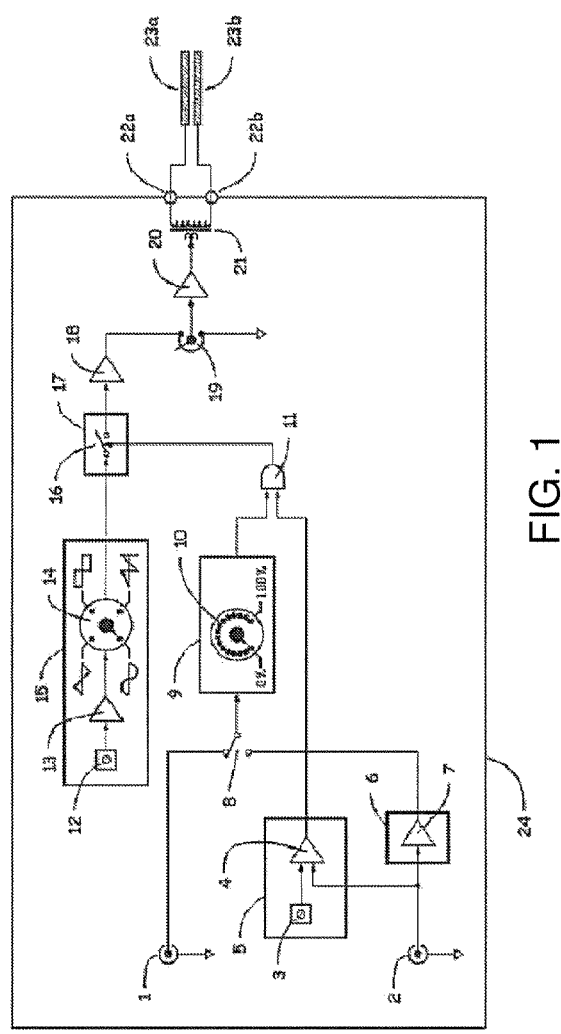
FIG. 1. is a block diagram of the plasma electronics.

An exemplary circuit diagram for the plasma power supply of the present invention is shown in FIG. 1. The illustrated embodiment of the invention includes modulation frequency TTL input jack 1, modulation frequency analog input jack 2, analog enable/disable switch trip set-point 3, analog level comparator 4, electronic enable/disable switch circuitry 5, modulation voltage-controlled oscillator (VCO) circuitry 6, modulation VCO 7, modulation control mode selector switch 8, electronic variable duty cycle circuitry 9, electronic variable duty cycle set-point 10, electronic summing circuitry 11, plasma carrier frequency set-point 12, plasma VCO 13, waveform-type selector switch 14, plasma carrier VCO circuitry 15, electronic switch 16, electronic switch circuitry 17, buffer 18, plasma level control 19, power amplifier 20, step-up transformer 21, output jacks 22, and plasma actuator 23. Most of these components are comprised by the complete plasma electronics unit 24 (i.e., the "power supply").

The illustrated design allows for independent control of plasma power level, plasma frequency, modulation frequency, and duty cycle, without any interaction between parameters. The overall circuit consists of four major components; the plasma carrier voltage-controlled oscillator (VCO) 15, modulation VCO 6, power amplifier 20, and step-up transformer 21. All of these components are preferably tailored for the specific application. The plasma frequency will range from 10 kilohertz to several hundred kilohertz. The modulation frequency, which is a function of flow speed and cord length, can vary from a few hertz to tens of kilohertz. The power level can range from a few watts to several thousand watts.

Plasma carrier VCO 15 is designed to generate any one of four waveforms. It is designed around two VCO devices. The first VCO acts as a function generator. This unit is responsible for generating three of the four waveforms: triangle wave, sine wave, and square wave. The second VCO feeds an 8-bit binary counter which supplies an 8-bit word to a multiplying DAC. With this scheme, a sawtooth waveform is generated. This is a 256-step staircase generator, with a selectable sharp leading or sharp trailing edge. One advantage to this sawtooth oscillator design is its ability to generate a constant wave-shape independent of frequency.

The frequency of the plasma oscillator can be automatically adjusted to compensate for the reactance found in the high voltage transformer. If the transformer presents itself as a resistive load to the power amplifier (unity power factor), maximum power transfer is achieved.

Modulation VCO 6 feeds a 4-bit binary counter, followed by a 4- to 16-line decoder. This decoder sequentially energizes 16 discrete outputs. The user can select which of these outputs compose the "on" portion of the modulation cycle, and which compose the "off" portion. For instance, if the first output is enabled, while the remaining fifteen are not, the resultant duty cycle is $1/16^{th}$ or 6.25%. If the first 8 outputs are enabled while the remaining 8 are not, the duty cycle is $8/16^{ths}$ or 50% (and so on). With this scheme, the output frequency and duty cycle are independently adjustable without any interaction between them. The output of this oscillator controls an electronic switch which enables or disables the plasma oscillator.

Power amplifier 20 is a custom-tailored amplifier designed to remain stable while connected to loads. Any number of these amplifiers can be series or parallel connected to provide any desired output power. Each amplifier can provide as much as 10 amps RMS at 20 volts RMS. The optimal output voltage/current is load impedance dependant.

Step-up transformer 21 has a single primary and single secondary. The transformer is wound to present a 4-ohm load to each power amplifier while providing the appropriate output voltage for the specific application. It has a ferrite core sized appropriately for the desired power level, and is wound with litz wire to help reduce IR losses. The typical output voltage for a step-up transformer is between 9 and 19 kilovolts peak-to-peak.

Figure 2:
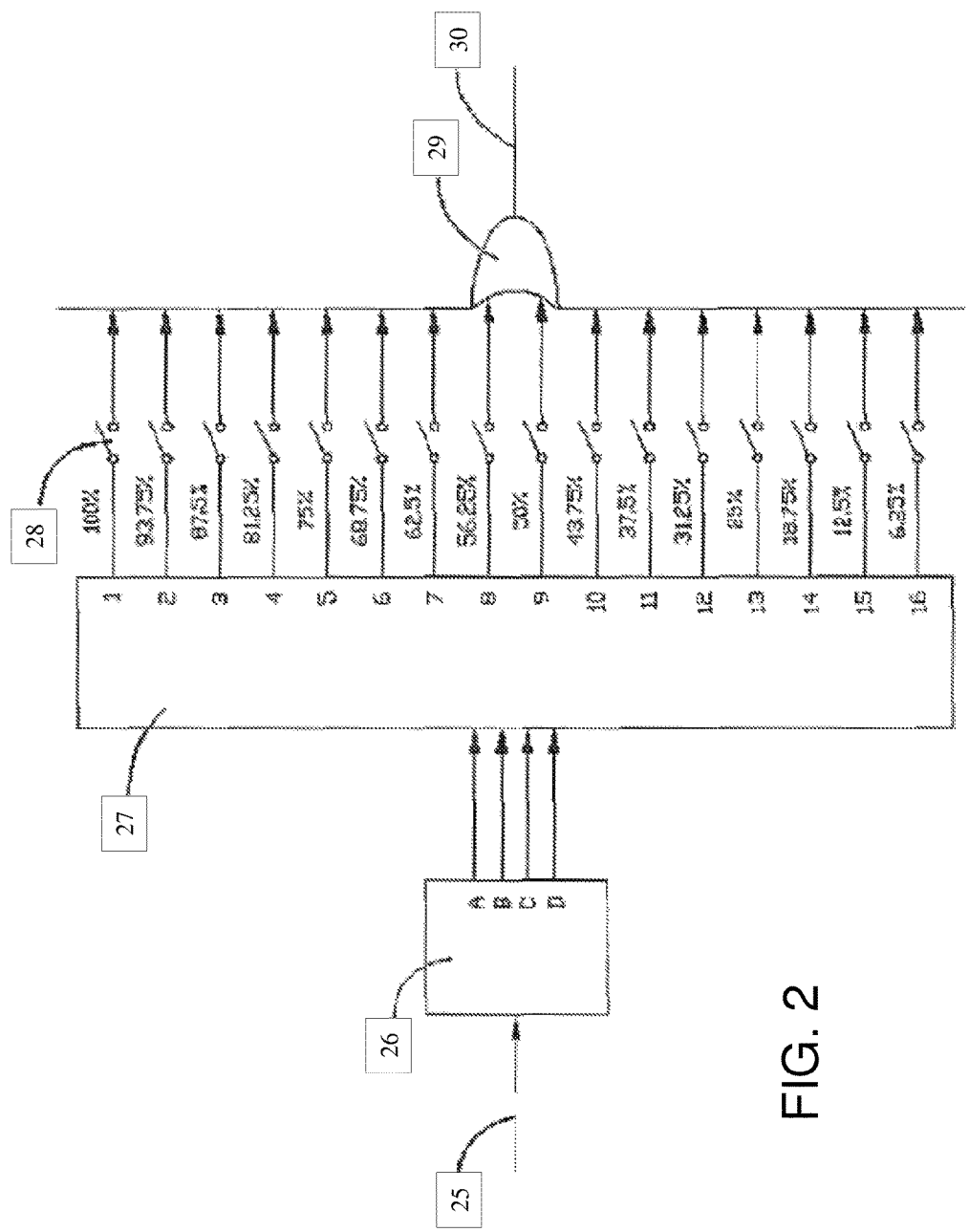
FIG. 2. illustrates the variable duty cycle circuit of the present invention.

FIG. 2 illustrates a variable duty cycle circuit comprising clock line input 25, 4-bit binary counter 26, 4-16 line decoder 27, duty cycle selector switches 28, OR gate 29, and output 30. The variable duty cycle circuit shown in FIG. 2 is a unique way of using a 4-bit binary counter 26 in conjunction with a 4- to 16-line decoder 27 whose outputs are summed to form a pulse. The width of this pulse can be adjusted using n-number of switches 28. If one switch is selected, for instance, the duty cycle is $1/16^{th}$, or 6.25%. If 8 switches are selected, the duty cycle will be $8/16^{ths}$ or 50%, etc. This allows for a pulse whose frequency and duty cycle are independently adjustable without any interaction between the two. In closed-loop or open-loop feedback automatically controlled embodiments of the present invention, these switches 28 could, depending on the particular application, be set and optimized by the automatic controller of the present invention. In some instances, it is more advantageous to optimize the duty cycle for the application and set the switches permanently for that application's particular optimal duty cycle configuration.

Preferably, the power supply of the present invention is manufactured within its own modular enclosure made of lightweight durable material such as a hard plastic or aluminum. Preferably, it is connected to any external source of power, and to the plasma actuator(s) which it energizes, through easily connected and disconnected electrical connectors as are known in the art for true modularity. Preferably the power supply's housing is seated securely within the aerostructure (wing, turbine blade, automobile, etc.) by screws, snaps, bolts, locks, or other easily removed types of fasteners as are known in the art.

In one embodiment, the power supply of the present invention supplies a maximum power of 70 watts continuous to a maximum actuator length (at 20 watts per foot) of 106 cm (42 inches) and has these other specifications: plasma frequency range: 10 kHz-45 kHz; plasma waveform: sine, square, or triangle (user selectable); modulation VCO frequency range: 10 Hz-600 Hz; modulation VCO control voltage range: 0-10 VDC; modulation VCO control voltage input impedance: 40 kohms; output duty cycle range: 6.25%-100% in 16 steps; battery type: two groups of eight 640 mah poly lithium cells; battery operating life (fully charged): 90 minutes (at 70 watts & 25% duty cycle)' battery charge time (batteries fully exhausted): 1 hour per 8 cells (2 hours total time); battery charge/discharge cycles: 600 minimum (while maintaining >80% capacity); size: 12.1 cm wide by 14.6 cm long by 10.8 cm high (4¾ inches by 5¾ inches by 4¼ inch); weight (total including batteries): 1.056 kg (2.33 lbs.); cooling: two internal cooling fans with overtemp protection; operating temperature: 0° C. to 40° C. charging, −20° C. to 40° C. running; storage temperature: −20° C. to 50° C.

To produce the high voltage and power, the present invention may in some embodiments comprise a custom transformer or inverter or a voltage boost circuit, or may use a commercial over-the-shelf transformer selected for its small size and voltage output capabilities, such as those commonly used in stun guns such as Tasers. Such a transformer is traditionally about one cubic inch; however, using the specialized electronics consisting of charge pump circuitry, phase compensation, voltage regulation and other electronic design techniques, a custom transformer may be fabricated with a volume of less than 1 cubic inch. More preferably, this specialized electronic system is produced in a form factor of less than ⅛ the volume using high voltage semiconductor components. The weight of the plasma electronics—minus the energy storage components (batteries)—is thus less than 200 grams and preferably less than 100 grams in the 1 inch cube form factor and weighs less than 100 grams and preferably less than 50 grams when the volume is reduced to ⅛ inch cube volume. The power supply of the present invention, excluding batteries, is thus made to 1 inch by 1 inch by ½ inch dimensions for use in wind turbine applications, allowing the power supply to be placed within the turbine blade itself (or within the hub) of even smaller, thinner turbine blades.

The power supply of the present invention is preferably modular and provides the power to drive the plasma actuators. The power supply is controlled preferably with an analog or digital processor or other electronics which are part of the power supply and can automatically adjust various characteristics described elsewhere herein of the power provided to the plasma actuators. This processor or other electronics preferably control switches that control the duty cycle. While it is preferable that the processor is integrated into the power supply, the processor or other electronics which control the power characteristics can also be external to the power supply in specific situations. The processor or other electronics whether incorporated into the power supply or external thereto can also be used to control multiple power supplies, which can be ganged either in series or in parallel. The processor or electronics that automatically adjust one or more characteristics of the power supply can be controlled by various types of control algorithms. The algorithms can be for example a proportional-integral-derivative (PID) control algorithm, an adaptive predictive control algorithm, or an adaptive predictive feedback control algorithm. The power supplies through the processor or electronics that are used to adjust various characteristics of the power supplied may be further linked through a global controller to coordinate the actuation of the plasma actuators to better control airflow about the aero platform or one of its surfaces, to better control noise, to better reduce vibration, and the like.

Figure 3:
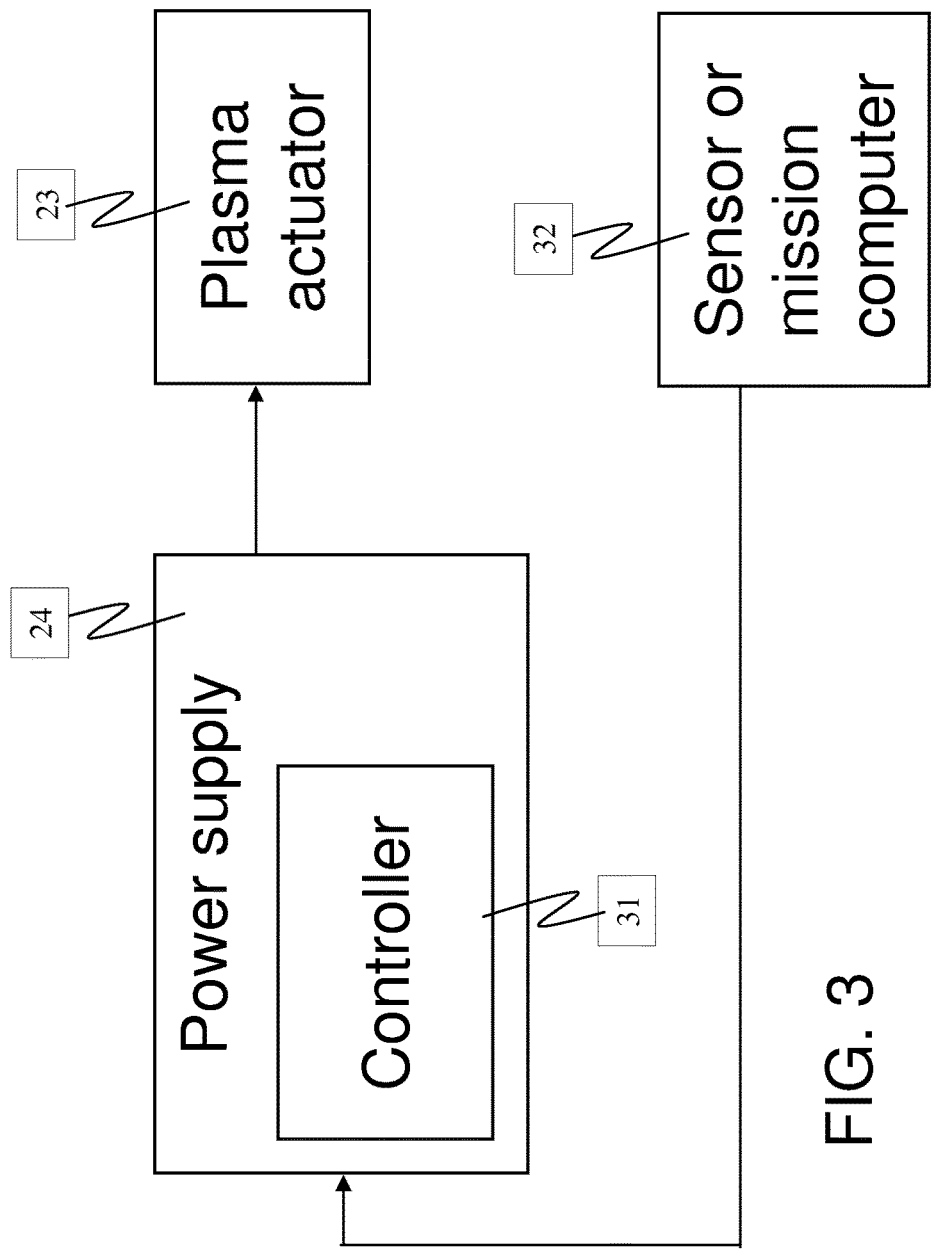
FIG. 3. is a simplified control flow diagram of the present invention for a single plasma actuator power supply.
Figure 4:
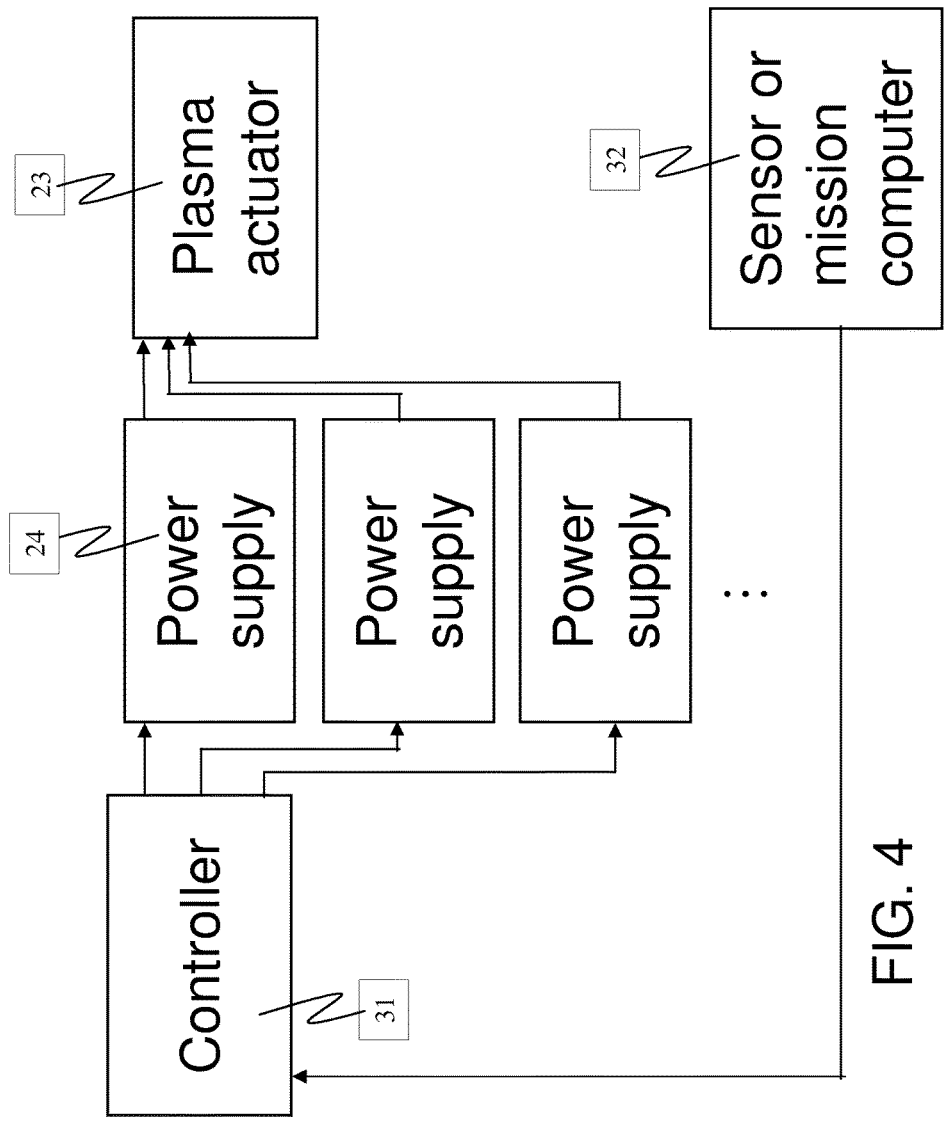
FIG. 4. is a simplified control flow diagram of the present invention for multiple plasma actuator power supplies ganged in parallel.

Sensors which may feed the controller 31 of the present invention may include any type of pressure sensor, accelerometer, gyroscope, or shear sensor known in the art for closed-loop feedback control. Sensors useful for open loop feedback are those that measure linear or rotational velocity, such as a speedometer, anemometer, pitot tube, rotary encoder, GPS, radar, lidar, sonar, etc. Sensors may also be those that measure angle of attack of an aero platform such as a rotary encoder, artificial horizon, or any other input from an onboard mission computer or sensor-processing electronic control unit of the aero platform capable of providing information relating to the vehicle state including spatial awareness including angle of attack, rotating, velocity, spatial position, acceleration, air pressure, or elevation. These sensors or onboard mission computer, etc. are designated 32 in FIGS. 3 and 4, which show simplified control flow for the case of a single power supply 24 (FIG. 3) or multiple power supplies ganged in parallel (FIG. 4). In FIG. 3, the controller is integrated into the modular power supply whereas in FIG. 4 a separate controller supplies control commands to multiple parallel power supplies 24 which together power a plasma actuator 23. Power supplies may also be ganged in series. The controller thus permits the system to be self-tuning (via a closed feedback loop) or based on signals received from the speedometer of car, air velocity, angle of attack, windspeed, It should be noted, of course, that in FIG. 3 or FIG. 4 multiple power supplies may also power multiple plasma actuators in any configuration.

The source of electrical energy for the power supply of the present invention may be any type of battery but is preferably a lightweight battery such as are known in the art. It may also be capacitive-based. Further, preferably, it is kept charged or recharged by an outside source providing power, such as the wind turbine itself into which the power supply of the present invention is integrated, or the internal combustion engine of the ground or air vehicle into which the power supply of the present invention is integrated.

The peak current consumption can be a concern when running the plasma power supplies on batteries or onboard a vehicle. To mitigate this concern, a scheme to stagger the outputs of a multiple actuator system is preferably designed into the controller 31, which will drastically reduce the peak current requirement of the system. A good example of this would be a 10 actuator system. If the individual actuators are set to operate at a maximum of 10% duty cycle, the outputs of multiple power amplifiers can be staggered as to prevent any two actuators from operating at the same time. 10 actuators can thus operate simultaneously, with only one actuator producing plasma at any given time. This will limit the peak current as seen by the battery/vehicle supply to an equivalent of one actuator running at 100% duty. Another example of this would be a 5 actuator system set for a maximum of 20% duty per actuator.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. An aero platform selected from one of an air vehicle, an unmanned air vehicle (UAV), a micro air vehicle, a projectile, a munition, or a missile, the aero platform being substantially contained within an aerostructure, the aero platform comprising:
   at least one plasma actuator placed on or integrated within the aerostructure and configured to perform one or more of the functions of controlling airflow, reducing noise, reducing vibration, modifying lift, or modifying drag; and
   at least one self-contained modular plasma electronic power supply integrated into the aerostructure of the aero platform, the power supply having independently and automatically adjustable, non-interactive control of one or more of voltage, frequency, waveform, and duty cycle,
   wherein the power supply powers, actuates and regulates the at least one plasma actuator.

2. The aero platform in claim 1, wherein the power supply is controlled by a processor, said processor being integrated into the power supply.

3. The aero platform in claim 2, further comprising at least five plasma actuators, wherein each plasma actuator is set to operate at a maximum of 20% duty cycle and where no two plasma actuators operate at the same time.

4. The aero platform in claim 2, further comprising at least one sensor comprising a signal, wherein the controller self-tunes the at least one power supply based at least in part on the signal from the at least one sensor.

5. The aero platform in claim 1, wherein the power supply is powered by a capacitive battery.

6. The aero platform in claim 1, wherein the power supply, including a transformer but excluding any battery or other electrical energy source, has a volume equal to or less than 1 cubic inch and a weight equal to or less than 100 grams.

7. A method of plasma surface control for an aero platform selected from one of an air vehicle, an unmanned air vehicle (UAV), a micro air vehicle, a projectile, a munition, or a missile, the aero platform being contained within an aerostructure, the method comprising the steps of:
   a) locating a plasma actuator on a surface of an aerostructure to control one or more of the functions of controlling airflow, reducing noise, reducing vibration, modifying lift, or modifying drag;
b) obtaining a velocity of air passing over the plasma actuator; and
c) controlling the plasma actuator with a self-contained modular plasma alternating current (AC) electronic power supply integrated into the aerostructure of the aero platform, the plasma electronic power supply having automatically and independently adjustable non-interactive control of one or more of voltage, frequency, waveform, and duty cycle based at least part on the velocity of air passing over the plasma actuator.

8. The method in claim 7, wherein the power supply comprises a variable duty cycle circuit comprising clock line input, a 4-bit binary counter, a 4- to 16-line decoder, and duty cycle selector switches, wherein outputs of the decoder are summed to form a pulse, and the width of the pulse is adjusted by the switches.

9. The method in claim 8, wherein the power supply comprises an electrical circuit, the electrical circuit comprising a plasma carrier voltage-controlled oscillator (VCO), a modulation VCO, a power amplifier, and a step-up transformer, and the plasma carrier voltage-controlled oscillator (VCO) comprises two VCO devices, the first VCO device capable of generating triangle waveforms, sine waveforms, and square waveforms, and the second VCO device capable of generating sawtooth waveforms.

10. The method in claim 8, further comprising at least one sensor comprising a signal, wherein the controller self-tunes the at least one power supply based at least in part on the signal from the at least one sensor.

11. The method in claim 7, wherein the power supply comprises a power amplifier designed to remain stable while connected to loads, and capable of providing power at a magnitude of up to 10 amperes (amps) root mean square (RMS) at 20 volts RMS.

12. The method in claim 7, wherein the power supply comprises at least five plasma actuators, wherein each plasma actuator is set to operate at a maximum of 20% duty cycle and where no two plasma actuators operate at the same time.

13. The method in claim 7, wherein the power supply, including a transformer but excluding any battery or other electrical energy source, weighs equal to or less than 100 grams.

14. A ground vehicle, the ground vehicle being substantially contained within an aerostructure, the ground vehicle comprising:

at least one plasma actuator placed on or integrated within the aerostructure and configured to perform one or more of the functions of controlling airflow, reducing noise, reducing vibration, modifying lift, or modifying drag; and at least one self-contained modular plasma electronic power supply comprising an electrical circuit, the electrical circuit comprising a plasma carrier voltage-controlled oscillator (VCO), a modulation VCO, a power amplifier, and a step-up transformer, the power supply integrated into the ground vehicle, the power supply having independently and automatically adjustable, non-interactive control of the voltage, frequency, waveform, and duty cycle, wherein the power supply powers and regulates the at least one plasma actuator.

15. The ground vehicle in claim 14, wherein the plasma carrier voltage-controlled oscillator (VCO) comprises two VCO devices, the first VCO device capable of generating triangle waveforms, sine waveforms, and square waveforms, and the second VCO device capable of generating sawtooth waveforms.

16. The ground vehicle in claim 15, wherein the power supply is controlled by a processor, said processor being integrated into the power supply.

17. The ground vehicle in claim 14, further comprising a transformer, the transformer comprising charge pump circuitry, and phase compensation, voltage regulation, wherein the transformer is constructed to have a volume less than or equal to 1 cubic inch.

18. The ground vehicle in claim 15, further comprising at least one sensor comprising a signal, wherein the controller self-tunes the at least one power supply based at least in part on the signal from the at least one sensor.

19. The ground vehicle in claim 14, wherein the power supply is housed within a modular enclosure made of lightweight durable material and is connected to both an external source of power and to the at least one plasma actuator which it energizes, and the connections are capable of being easily connected and disconnected.

20. The ground vehicle in claim 14, wherein the power supply comprises at least five plasma actuators, wherein each plasma actuator is set to operate at a maximum of 20% duty cycle and where no two plasma actuators operate at the same time.

* * * * *